(12) United States Patent
Happonen

(10) Patent No.: US 6,680,983 B2
(45) Date of Patent: Jan. 20, 2004

(54) METHOD FOR NOISE ENERGY ESTIMATION

(75) Inventor: Aki Happonen, Kiiminki (FI)

(73) Assignee: Nokia Corporation, Espoo (FI)

( * ) Notice: Subject to any disclaimer, the term of this patent is extended or adjusted under 35 U.S.C. 154(b) by 171 days.

(21) Appl. No.: 10/041,716

(22) Filed: Jan. 4, 2002

(65) Prior Publication Data

US 2002/0154710 A1 Oct. 24, 2002

Related U.S. Application Data

(63) Continuation of application No. PCT/EP99/05383, filed on Jul. 27, 1999.

(51) Int. Cl.$^7$ .............................. H04L 27/06; H03D 1/04
(52) U.S. Cl. ...................................... 375/316; 375/346
(58) Field of Search ................................ 375/316, 346, 375/320, 340, 331, 278; 370/335, 342, 522

(56) References Cited

U.S. PATENT DOCUMENTS

| | | | |
|---|---|---|---|
| 5,297,161 A | * 3/1994 | Ling | 375/130 |
| 5,379,324 A | 1/1995 | Mueller et al. | 375/340 |
| 5,418,789 A | 5/1995 | Gersbach et al. | 714/705 |
| 5,727,028 A | * 3/1998 | Ghosh et al. | 375/340 |
| 5,838,737 A | 11/1998 | Yamaguchi et al. | 375/331 |
| 6,603,823 B1 | * 8/2003 | Yellin et al. | 375/340 |

FOREIGN PATENT DOCUMENTS

| | | |
|---|---|---|
| WO | 0030275 | 5/2000 |

OTHER PUBLICATIONS

Patent Abstracts of Japan, vol. 011, No. 020 (E–472) Jan. 20, 1987 and Publication No. JP 61 189751 (Fujitsu Ltd), Aug. 23, 1986.

* cited by examiner

*Primary Examiner*—Khai Tran
(74) *Attorney, Agent, or Firm*—Ware, Fressola, Van Der Sluys & Adolphson LLP

(57) ABSTRACT

A signal processing method is described for processing a signal transmitted via a transmission channel. The method comprising the steps of: receiving (S11) a plurality of samples of the signal; analyzing (S12) the amplitude of a subset of the received samples; and estimating (S13) the variance of the signal based on the amplitude of the subset of the received samples. A corresponding signal processing device is also described. Thus, with the present invention it is possible to estimate the variance on the basis of the amplitude of the received signal. In consequence, no information about channel impulse response or training sequence is required.

12 Claims, 3 Drawing Sheets

METHOD FOR NOISE ENERGY ESTIMATION

CROSS-REFERENCE TO RELATED APPLICATION

This application is a continuation of International Application PCT/EP99/05383 having an international filing date of Jul. 27, 1999 and from which priority is claimed under all applicable sections of Title 35 of the United States Code including, but not limited to, Sections 120, 363 and 365(c).

FIELD OF THE INVENTION

The present invention relates to a signal processing method for processing a signal having been transmitted via a transmission channel. Also, the present invention relates to a corresponding signal processing device.

BACKGROUND OF THE INVENTION

In telecommunication systems such as mobile telecommunication systems, for example, data signals are exchanged between a first transceiver and (at least) a second transceiver.

For the subsequent explanations, it is focused on a communication between said first and a specific one of said second transceivers.

Namely, in such a communication, initially transmitted data can be subjected to various external influences resulting in a deterioration of the transmitted data at the receiver side. For example, in a mobile telecommunication system such as the GSM system operating according to TDMA (Time Divisional Multiple Access), data may be subjected to an attenuation in the course of propagation along a transmission path between the first and second transceiver devices (base transceiver station BTS and mobile station MS, for example). Also, depending on the environment in the "vicinity" of the transmission path, a phenomenon known as multi-path propagation may occur.

The transmission path as the respective "channel" for the data to be communicated in such cases assumes a channel transfer function which differs from the assumed ideal channel transfer function. Such a channel transfer function is also referred to as channel impulse response.

Therefore, in order to achieve an error-free communication between first and second transceivers, at the receiver side, the received (deteriorated) data signals have to be processed to reconstruct the initially sent signals. This reconstruction is effected by so-called equalizers provided for at a respective receiver side.

In principle, an equalizer processes the received signals having been subjected to a non-ideal channel transfer function, by applying the inverse of the non-ideal channel transfer function/channel impulse response to the received signals.

To this end, an estimation of the channel impulse response of the (non-ideal) transmission channel is required.

Various concepts of channel impulse response estimation have already been proposed in literature, which are based on a statistical evaluation of the received data signals in order to estimate a channel impulse response function.

As an important statistical parameter in mobile telecommunication systems, noise energy is estimated from received data signals. The energy of noise (or energy of estimated interference) is closely related to the variance of the received signals. Hence, an estimate of the variance of the received signals is used as the energy of noise in such systems.

This estimate of the signal variance (noise energy) is used for determining the quality of received signals (e.g. expressed as the Bit Error Rate BER), and is also used in the receiver, for example in connection with the estimation of a channel impulse response function for equalization of the received signals.

Hitherto, various approaches are described in literature, for obtaining an estimate of noise energy/variance as a result of a signal processing method for processing a signal having been transmitted via a transmission channel Firstly, according to one known approach, the noise energy is calculated based on the difference between a received signal and a result of a convolution of a training sequence (contained in a part of a transmitted signal) and an estimated impulse response. However, performing a convolution operation has a drawback in that it is a cumbersome operation in regard of signal processing power and time consumed. Moreover, information contained in the training sequence has to be extracted from the received signals in order to perform the convolution operation, which additionally imposes a timing/detection problem to the receiver for extracting the training sequence.

Secondly, there are receiver types which estimate the variance (noise energy) according to results obtained by applying the Viterbi algorithm. However, Viterbi algorithm is only optimum as long as the channel impulse response is known, so that an incorrect or only roughly approximated channel impulse response function will lead to incorrect results of the estimated variance.

Thirdly, there exists an approach according to which the signal variance is estimated based on the energy of the received signal and the energy of channel impulse response taps. A respective channel impulse response tap can be considered to correspond to a respective path component of a multi-path propagation channel model. Hence, also for this method, it is either necessary to know the (exact) channel impulse response function in order to have a knowledge of impulse response taps, or to use an approximated, hence, incorrect, multi-path channel model (e.g. restricted to only two or three path model). However, an exact knowledge of the impulse response is rather difficult to obtain, while using an approximated model leads to incorrect estimation results of the variance (noise energy).

From Patent Abstracts of Japan, Vol. 011, No. 020(E-472), Jan. 20, 1978 and JP-A-61189751 (Fujitsu Ltd.), Aug. 23, 1986 a signal processing method for processing a signal having been transmitted via a transmission channel, the method comprising the steps of receiving said signal, analyzing the amplitude of a part of said received signal, and estimating the variance of said signal based on the amplitude of said part, as well as a corresponding processing device is known.

SUMMARY OF THE INVENTION

Hence, it is an object of the present invention to provide a signal processing method for processing a signal having been transmitted via a transmission channel, which is free from the above drawbacks inherent to prior known approaches. Furthermore, it is an object of the present invention to provide a corresponding signal processing device for processing a signal having been transmitted via a transmission channel.

According to the present invention, this object is achieved by a signal processing method for processing a signal having been transmitted via a transmission channel, the method comprising the steps of:

receiving (S11) a plurality of samples of said signal;
analyzing (S12) the amplitude of a subset of said plurality of received samples; and
estimating (S13) the variance of the signal based on the amplitude of the subset of said plurality of received samples,
wherein the subset of the plurality of samples is defined as a number (N) of samples within an interval ((x:y)) of the plurality of received signal samples, with x being a first sample of the subset and y being a $N^{th}$ sample of the subset,
wherein the step of analyzing (S12) the amplitude comprises
a first detecting step (S21) of detecting an absolute maximum (refi) among imaginary parts of the number (N) of signal samples, and
a second detecting step (S22) of detecting an absolute maximum (refq) among real parts of the number (N) of signal samples,
wherein in the first detecting step (S121), the absolute maximum (refi) among imaginary parts is detected according to a relation refi=max(|Qdata(x:y)|), and
in the second detecting step (S122), the absolute maximum (refq) among real parts is detected according to a relation refq=max(|Qdata(x:y)|), wherein Idata represents an imaginary part of a received sample, and Qdata represents a real part of a received sample, and
wherein in the estimating step (S13) the variance (var) is estimated according to a relation $$\text{var} = A * \text{var}p$$
$$= A * 1/N * \sum_{k=1}^{N} \left( (refi - |Idata(x:y)|)^2 + (refq - |Qdata(x:y)|)^2 \right)$$

where Idata(x:y) and Qdata(x:y), respectively, denote a respective imaginary/real component of an $k^{th}$ sample within the subset of N samples in which x represents the first sample and y represents the $N^{th}$ sample, and varp represents a preliminary variance to be scaled by a scaling factor A.

Also, the above object is achieved by a signal processing device (30) for processing a signal having been transmitted via a transmission channel (31), the device comprising:
receiving means (32,33) adapted to receive a plurality of samples of the signal;
analyzing means (34, 34a, 34b) adapted to analyze the amplitude of a subset of the plurality of received samples; and
estimating means (35, 35a) adapted to estimate the variance of the signal based on the amplitude of the subset of the plurality of received samples,
wherein the subset of the plurality of samples is defined as a number (N) of samples within an interval ((x:y)) of the plurality of received signal samples, with x being a first sample of the subset and y being a $N^{th}$ sample of the subset, the subset being buffered in a buffer means (33),
wherein the analyzing means (34) further comprises
a first analyzing element (34a) adapted to detect an absolute maximum (refi) among imaginary parts of the number (N) of signal samples, and
a second analyzing element (34b) adapted to detect an absolute maximum (refq) among real parts of the number (N) of signal samples, wherein the first analyzing element (34a) is adapted to detect the absolute maximum (refi) among imaginary parts according to a relation refi=max(|data(x:y)|), and the second analyzing element (34b) is adapted to detect the absolute maximum (refq) among real parts according to a relation refq=max(|Qdata(x:y)|), wherein Idata represents an imaginary part of a received sample, and Qdata represents a real part of a received sample, and
wherein the estimation means (35) further comprises calculation elements (35a), the calculation element being configured such that the variance (var) is estimated according to a relation $$\text{var} = A * \text{var}p$$
$$= A * 1/N * \sum_{k=1}^{N} \left( (refi - |Idata(x:y)|)^2 + (refq - |Qdata(x:y)|)^2 \right)$$

where Idata(x:y) and Qdata(x:y), respectively, denote a respective imaginary/real component of an $k^{th}$ sample within the subset of N samples in which x represents the first sample and y represents the $N^{th}$ sample, and varp represents a preliminary variance to be scaled by a scaling factor A.

Favorable refinements of the present invention are set out in the dependent claims.

Accordingly, the present invention advantageously provides a very simple method to estimate the signal variance (noise energy). Still further, the present invention can advantageously be used in connection with LMMSE based type of channel impulse response estimation devices and methods as for example proposed in same applicants former patent application PCT/EP 98/07393, where the variance is supplied as a parameter to the estimation device.

Also, with the present invention it is possible to estimate the variance on the basis of the amplitude of the received signal. Consequently, no information about channel impulse response or training sequence is required. Additionally, no "preprocessing" is required in order to obtain a channel impulse response function on the basis of which the variance is subsequently estimated, which reduces the required processing time.

The latter in turn removes the above mentioned timing/detection problems for extracting the training sequence from the received signals.

When applied to a diversity type receiver device, results of experiments conducted by the present inventor show that a ratio between a main branch variance and a diversity branch variance is correct, so that the proposed invention can also be applied to a diversity type receiver.

BRIEF DESCRIPTION OF THE DRAWINGS

The present invention will be described herein below in greater detail with reference to the accompanying drawings, in which.

DETAILED DESCRIPTION OF EMBODIMENTS

The present invention is now described in detail with reference to the drawings.

According to the present invention, instead of calculating the channel impulse response function of the received data signals and estimating the variance (noise energy) based on the estimated channel impulse response, the variance is estimated based on the amplitude of the received signals.

In order to facilitate the following detailed explanation and the understanding of used terms, the following should be noted.

Data signals received at a receiver side and having been transmitted via a transmission path are received as a sequence of signals or signal samples, respectively, denoted for example by ( . . . , w, . . . , x . . . , y, . . . , z, . . . ). Each signal is represented by its complex values, so that a signal sample x is expressed as x=Qx+j Ix. That is, the signal sample x has its real part value Qx and its imaginary part value Ix. Likewise, a signal y is represented by y=Qy+jIy.

Further, an interval of data samples from x to y is denoted by (x:y), and is represented in a vector notation of a vector having N components, the vector component x being the first vector component and the component y being the $N^{th}$ vector component. Those N samples in the interval (x:y) of the overall signal samples represent a subset of N samples. A term "Idata(x:y)" denotes the set of imaginary values of Ix, . . . , Iy of the N samples, while a term "Qdata(x:y)" correspondingly denotes the set of real values of Qx, . . . , Qy of the N samples. Still further, an index variable of k=1 denotes the respective value of sample x, the index k=N denotes the respective value of sample y, and index values k, with 1<k<N denote the respective sample between the borders of the interval (x:y) of the subset of N samples. Finally, the subset of N (consecutive) values also corresponds to a corresponding time period.

Figure 1:
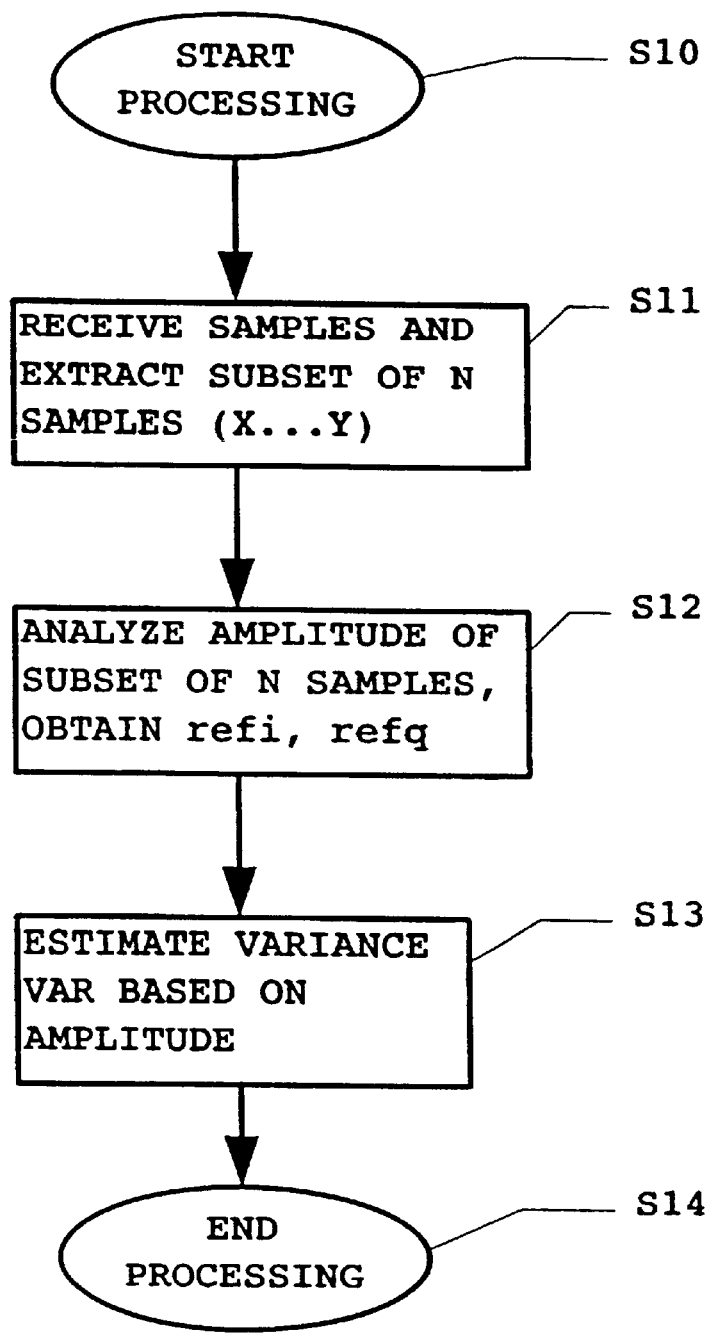
FIG. 1 shows a flowchart of the overall signal processing method according to the present invention.

Now, with reference to FIG. 1, this figure shows a flowchart of the overall signal processing method according to the present invention.

The signal processing (for obtaining an estimate of the signal variance of received signals) starts in step S10. Then, in a step S11, the sequence of signal samples ( . . . , w, . . . , x, . . . , y, . . . , z, . . . ) is received. Also, in this step S11, a subset of N samples (x, . . . , y) is extracted from the received overall sequence.

The number N of samples of the extracted subset can arbitrarily be set. Advantageously, the number N may correspond to the number of samples contained in a used training sequence. Moreover, the subset of N values can be extracted at an arbitrary position within the overall sequence of received samples. Nevertheless, if the number N corresponds to the number of samples of a used training sequence, it is advantageous to extract those N samples at a position within the overall sequence, which corresponds to the position (and/or transmission period) of the training sequence. It should however be noted that even in this case, no information contained in the training sequence is required (e.g. for comparison operations or the like).

Having received and extracted the subset of N samples in step S11, the flow proceeds to step S12.

In step S12, the subset of N samples is subjected to an amplitude analysis in order to obtain parameters refi and refq.

This amplitude analysis as performed in step S12 is detailed in connection with FIG. 2.

Figure 2:
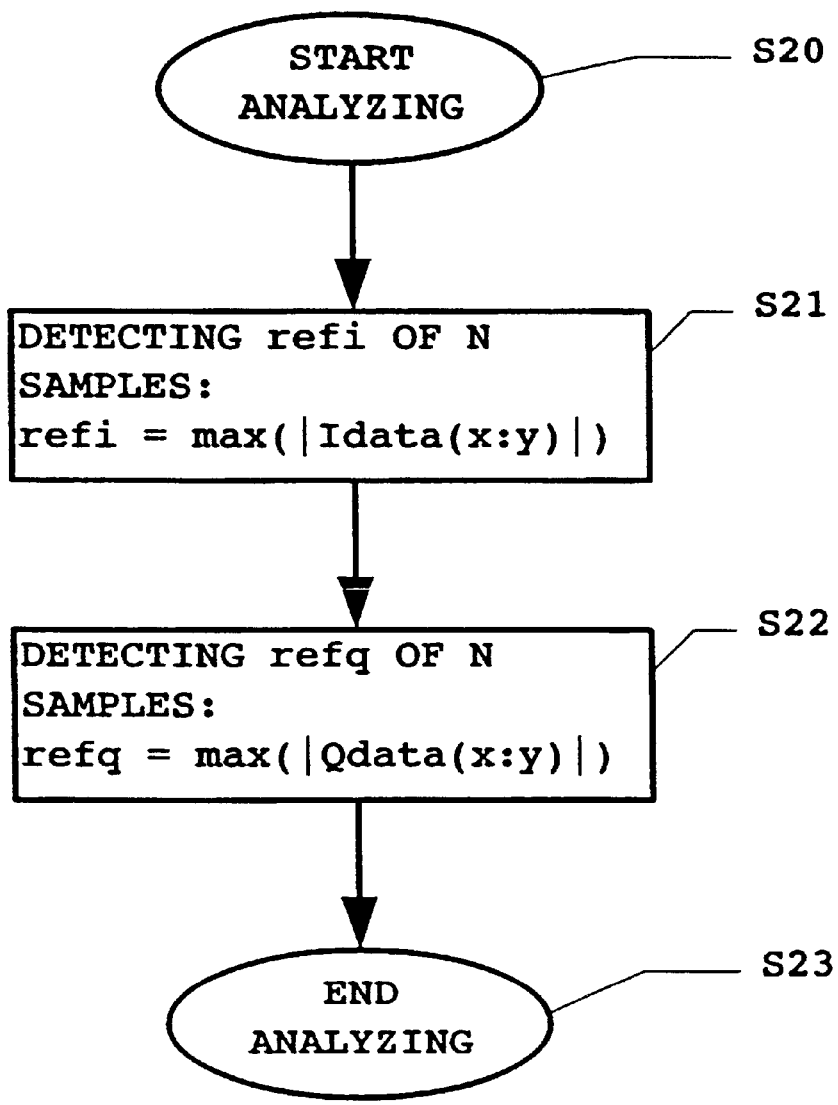
FIG. 2 illustrates details of an analyzing step shown in FIG. 1.

In FIG. 2, the analyzing process starts in step S20.

Then, in step S21, a detection of the parameter refi among the subset of N samples (x:y) is performed. That is, the parameter refi denotes the absolute maximum value of the imaginary data components of the N samples (x:y). More specifically, the parameter refi is determined as follows:

$$refi = \max(|Idata(x:y)|)$$

Subsequently, the analysis proceeds to step S22, in which a similar processing as in step S21 is performed in terms of the real components. That is, a detection of the parameter refq among the subset of N samples (x:y) is performed. Namely, the parameter refq denotes the absolute maximum value of the real signal components of the N samples (x:y). More specifically, the parameter refq is determined as follows:

$$refq = \max(|Qdata(x:y)|)$$

The flow then comes to step S23 where the analyzing processing is terminated.

After the subroutine explained in connection with FIG. 2 has been performed, the flow returns to the flow illustrated in FIG. 1 and proceeds to step S13.

In step S13, the variance var is estimated based on the amplitude of the received signals and the result of the previous analysis.

More precisely, the variance var is obtained by scaling a (preliminary) variance varp by a scaling factor A. The (preliminary) variance varp is obtained as follows:

$$\mathrm{var}p = 1/N * \sum_{k=1}^{N} \left( (refi - |Idata(x:y)|)^2 + (refq - |Qdata(x:y)|)^2 \right)$$

and, consequently, $$var = A * varp$$

In the above estimation formula according to the present invention, as mentioned herein above, Idata represents the imaginary branch I of the received signals, i.e. of the subset of N samples (in the corresponding time period) thereof, Qdata correspondingly represents the real branch Q thereof, refq is the absolute maximum of Qdata in the selected subset/period, refi is the absolute maximum of Idata in the selected subset/period, x and y define the position/period of a number N of samples within the overall signal samples received as a data signal stream, for which the variance is estimated, and A is the scaling factor.

As regards the scaling factor A, experiments conducted by the present inventor yielded that a value of A=⅛ can suitably be used. However, of course other scaling factors are also conceivable. In general, a specific scaling factor value is selected dependent on the environment where the device is to be used (method is to be implemented) and may also depend on the characteristics of an equipment used (e.g. thermal noise characteristics of the equipment).

After the estimation of the variance var is completed, the method flow comes to step S14 and the processing ends. The estimated variance var is thus available to be processed further/used within the receiver.

Figure 3:
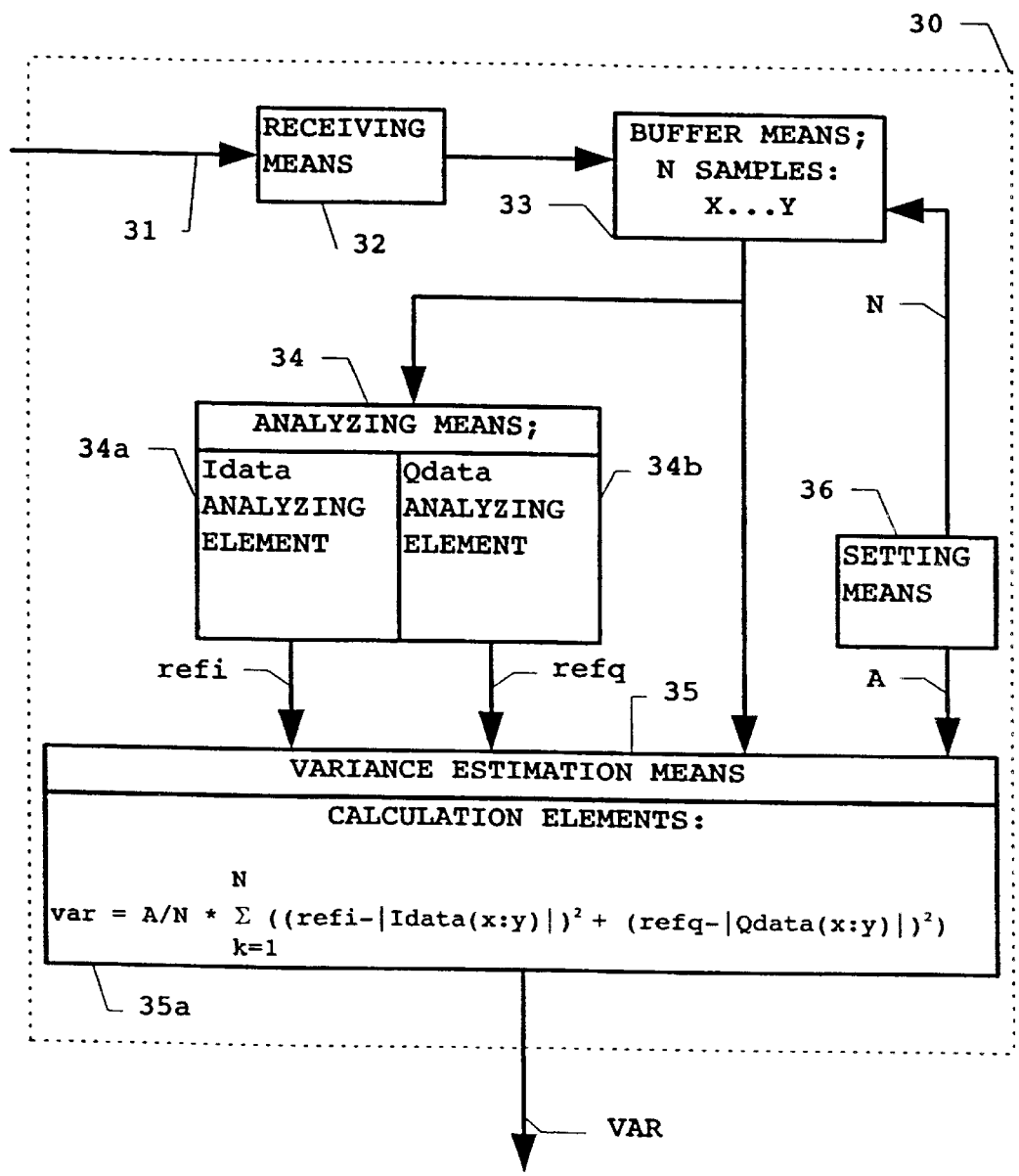
FIG. 3 depicts a schematic block circuit diagram of a signal processing device according to the present invention.

FIG. 3 shows a schematic block circuit diagram of a signal processing device according to the present invention.

The signal processing device is denoted by 30 and is provided with a control means (not shown) which controls the entire operation and interaction between individual means 32–36 of the signal processing device 30.

For example, the control means (not shown) is adapted to perform timing control for data exchange and processing within the signal processing device 30. However, since this is not critical to the present invention, a detailed description thereof is considered to be dispensable.

Nevertheless, it should also be noted that the control means (not shown) receives an information from a setting means 36 regarding the number N of the samples forming the subset of samples (x:y). The control means is adapted to, in response thereto, set a window of width N and place this window of width N at a position in the data signal stream in order to extract the subset of N samples at an arbitrarily selected position within the overall data signal stream. For example, the position of the window of width N may be set to coincide with the position of the transmitted training sequence. However, this is not required for the present invention for being implemented and carried out. The thus extracted subset is buffered in a buffer means 33.

Now returning to the description of the details illustrated in FIG. 3, the overall received data signals are received via a transmission path denoted with 31. The signals are received via the transmission path 31 at a receiving means 32. Associated to said receiving means 32 is a buffer means 33. In the buffer means, a subset of N signals is buffered. The buffer means receives an information of the number N of signal samples to be buffered from the setting means 36 and is controlled by the control means (not shown) to buffer N samples x, . . . , y contained in a selected window of width N within the overall data stream.

The thus buffered N signal samples are supplied to further means of the signal processing device 30 as follows.

The subset of N samples is supplied to an analyzing means 34. The analyzing means 34 comprises an Idata analyzing element and a Qdata analyzing element. The Idata analyzing element is adapted to obtain a parameter value refi from the supplied data according to the relation $$refi = \max(|Idata(x:y)|)$$

already explained herein before, while the Qdata analyzing element is adapted to obtain a parameter value refq from the supplied data according to the relation $$refq = \max(|Qdata(x:y)|)$$

already explained herein before.

The parameters refi and refq are supplied to a variance estimation means 35. Also, the samples of the N signal samples are supplied from the buffer means 33 to said variance estimation means 35, i.e. Idata(x:y) and Qdata(x:y) are supplied to the variance estimation means.

Also, the variance estimation means receives an additional input of the scaling factor A from the setting means 36.

The variance estimation means 35 comprises various calculation elements 35a (not shown in detail). Those calculation elements 35a are configured such that said variance is estimated according to the above mentioned relation $$var = A * varp$$

$$= A * 1/N * \sum_{k=1}^{N} \left( (refi - |Idata(x:y)|)^2 + (refq - |Qdata(x:y)|)^2 \right)$$

where Idata(x:y) and Qdata(x:y), respectively, denote a respective imaginary/real component of a $k^{th}$ sample within the subset of N samples in which x represents the first sample and y represents the $N^{th}$ sample, and varp represents a preliminary variance to be scaled by the scaling factor A.

Since the detailed configuration of the calculation elements 35a in order to perform the above indicated operation is not critical, a detailed description thereof is considered to be dispensable.

The estimated variance var is then available at an output of the device and can thus be supplied to further devices (not shown) of the receiver to be processed further/used therein.

Although the present invention has been described herein above in a general way by referring to the processing of received data transmitted via a transmission path, the present inventor found out that in order to achieve most reliable results with the method/device according to the present invention, the present invention should by applied to data which are modulated such that they have a constant amplitude. Stated in other words, the present invention is particularly suitably for being applied if the received data to be processed are modulated data, the amplitude of which is constant. For example, in mobile telecommunication, GMSK modulated data fulfill the above condition (GMSK= Gaussian Minimum Shift Keying).

Accordingly, as has been described herein above, the present invention proposes a signal processing method for processing a signal having been transmitted via a transmission channel, the method comprising the steps of: receiving S11 a plurality of samples of said signal; analyzing S12 the amplitude of a subset of said plurality of received samples; and estimating S13 the variance of said signal based on the amplitude of said subset of said plurality of received samples. Also, the present invention presents a corresponding signal processing device. Thus, with the present invention it is possible to estimate the variance on the basis of the amplitude of the received signal. In consequence, no information about channel impulse response or training sequence is required. Additionally, no "preprocessing" is required in order to obtain a channel impulse response function on the basis of which the variance is subsequently estimated, which reduces the required processing time. Also, the present invention advantageously provides a very simple method to estimate the signal variance (noise energy). Still further, the present invention can advantageously be used in connection with LMMSE based type of channel impulse response estimation devices and methods, where the variance is supplied as a parameter to the estimation device.

It should be understood that the above description and accompanying figures are only intended to illustrate the present invention by way of example only. The preferred embodiments of the present invention may thus vary within the scope of the attached claims.

What is claimed is:

1. A signal processing method for processing a signal having been transmitted via a transmission channel, the method comprising the steps of:

receiving (S11) a plurality of samples of said signal;

analyzing (S12) the amplitude of a subset of said plurality of received samples; and estimating (S13) the variance of said signal based on the amplitude of said subset of said plurality of received samples, wherein said subset of said plurality of samples is defined as a number (N) of samples within an interval ((x:y)) of the plurality of received signal samples, with x being a first sample of said subset and y being a $N^{th}$ sample of said subset, wherein said step of analyzing (S12) the amplitude comprises a first detecting step (S21) of detecting an absolute maximum (refi) among imaginary parts of said number (N) of signal samples, and a second detecting step (S22) of detecting an absolute maximum (refq) among real parts of said number (N) of signal samples, wherein in said first detecting step (S121), said absolute maximum (refi) among imaginary parts is detected according to a relation refi=max(|Idata(x:y)|), and in said second detecting step (S122), said absolute maximum (refq) among real parts is detected according to a relation refq=max(|Qdata(x:y)|), wherein Idata represents an imaginary part of a received sample, and Qdata represents a real part of a received sample, and wherein in said estimating step (S13) said variance (var) is estimated according to a relation $$\text{var} = A * \text{var}p$$

$$= A * 1/N * \sum_{k=1}^{N} \left( (refi - |Idata(x:y)|)^2 + (refq - |Qdata(x:y)|)^2 \right)$$

where Idata(x:y) and Qdata(x:y), respectively, denote a respective imaginary/real component of an $k^{th}$ sample within the subset of N samples in which x represents the first sample and y represents the $N^{th}$ sample, and varp represents a preliminary variance to be scaled by a scaling factor A.

2. A method according to claim 1, wherein said number (N) of said subset of samples corresponds to the length of a training sequence (TR_SEQ).

3. A method according to claim 2, wherein the signal to be processed is transmitted in a TDMA system.

4. A method according to claim 1, wherein the signal to be processed is a modulated signal of constant amplitude.

5. A method according to claim 4, wherein said signal is a GMSK modulated signal.

6. A method according to claim 1, wherein the signal to be processed is transmitted in a TDMA system.

7. A signal processing device (30) for processing a signal having been transmitted via a transmission channel (31), the device comprising:

receiving means (32,33) adapted to receive a plurality of samples of said signal;

analyzing means (34, 34a, 34b) adapted to analyze the amplitude of a subset of said plurality of received samples; and estimating means (35, 35a) adapted to estimate the variance of said signal based on the amplitude of said subset of said plurality of received samples, wherein said subset of said plurality of samples is defined as a number (N) of samples within an interval ((x:y)) of the plurality of received signal samples, with x being a first sample of said subset and y being a $N^{th}$ sample of said subset, said subset being buffered in a buffer means (33), wherein said analyzing means (34) further comprises
a first analyzing element (34a) adapted to detect an absolute maximum (refi) among imaginary parts of said number (N) of signal samples, and
a second analyzing element (34b) adapted to detect an absolute maximum (refq) among real parts of said number (N) of signal samples, wherein said first analyzing element (34a) is adapted to detect said absolute maximum (refi) among imaginary parts according to a relation refi=max(|Idata(x:y)|), and said second analyzing element (34b) is adapted to detect said absolute maximum (refq) among real parts according to a relation refq=max(|Qdata(x:y)|), wherein Idata represents an imaginary part of a received sample, and Qdata represents a real part of a received sample, and wherein said estimation means (35) further comprises calculation elements (35a), said calculation element being configured such that said variance (var) is estimated according to a relation $$\text{var} = A * \text{var}p$$

$$= A * 1/N * \sum_{k=1}^{N} \left( (refi - |Idata(x:y)|)^2 + (refq - |Qdata(x:y)|)^2 \right)$$

where Idata(x:y) and Qdata(x:y), respectively, denote a respective imaginary/real component of an $k^{th}$ sample within the subset of N samples in which x represents the first sample and y represents the $N^{th}$ sample, and varp represents a preliminary variance to be scaled by a scaling factor A.

8. A device according to claim 7, wherein said number (N) of said subset of samples corresponds to the length of a training sequence (TR_SEQ).

9. A device according to claim 8,
further comprising a setting means (36) adapted to set at least one of the following parameters:
said number (N) of samples constituting said subset of samples and to be buffered in said buffer means, and
said scaling factor (A) for scaling the preliminary variance (varp).

10. A device according to claim 7, wherein the signal to be processed is a modulated signal of constant amplitude.

11. A device according to claim 10, wherein said signal is a GMSK modulated signal.

12. A device according to claim 7,
further comprising a setting means (36) adapted to set at least one of the following parameters:
said number (N) of samples constituting said subset of samples and to be buffered in said buffer means, and
said scaling factor (A) for scaling the preliminary variance (varp).

* * * * *